United States Patent [19]
Weber

[11] 3,986,085
[45] Oct. 12, 1976

[54] CORONA POWER SUPPLY CIRCUIT

[75] Inventor: Harold J. Weber, Sherborn, Mass.

[73] Assignee: Coulter Information Systems, Inc., Bedford, Mass.

[22] Filed: Nov. 7, 1975

[21] Appl. No.: 629,803

Related U.S. Application Data

[63] Continuation of Ser. No. 532,713, Dec. 13, 1974, abandoned, which is a continuation-in-part of Ser. No. 378,136, July 11, 1973, abandoned.

[52] U.S. Cl. .................... 317/262 A; 321/2; 321/15
[51] Int. Cl.² ................................ H01T 19/00
[58] Field of Search ........... 317/3, 4, 262 R, 262 A; 321/2 R, 2 HF, 15; 331/113 R; 250/324–326; 323/DIG. 1

[56] References Cited
UNITED STATES PATENTS

| | | | |
|---|---|---|---|
| 2,965,755 | 12/1960 | West | 317/262 A |
| 2,985,812 | 5/1961 | Peterson | 321/15 |
| 3,280,368 | 10/1966 | Ahmed et al. | 317/DIG. 6 |
| 3,287,614 | 11/1966 | Sowiak | 317/262 A |
| 3,355,639 | 11/1967 | Semenhuk | 321/15 |
| 3,493,840 | 2/1970 | Rosenberg | 321/15 |
| 3,567,996 | 3/1971 | Gordon et al. | 317/3 |

OTHER PUBLICATIONS
RCA Application note ICAN–6267 "Digital Integrated Circuits" Mar. 1971 pp. 353–360.

*Primary Examiner*—Harry Moose
*Attorney, Agent, or Firm*—Silverman & Cass, Ltd.

[57] ABSTRACT

A portable power supply circuit for supplying a high voltage corona in a portable electrophotographic apparatus. An A.C. signal comprising a series of pulses is produced for a predetermined period of time. The pulses are shaped by a shaping circuit which draws current during only a portion of the operating cycle. These pulses are coupled through a step-up transformer to a multiplying circuit which multiplies the voltage at its input to the desired corona voltage. The power supply circuit includes a portable source of D.C. voltage such as a dry cell battery which supplies the necessary current and voltage. The power supply circuit is designed also to provide a number of D.C. bias voltages of polarity opposite to the corona voltage.

32 Claims, 1 Drawing Figure

U.S. Patent  Oct. 12, 1976  3,986,085
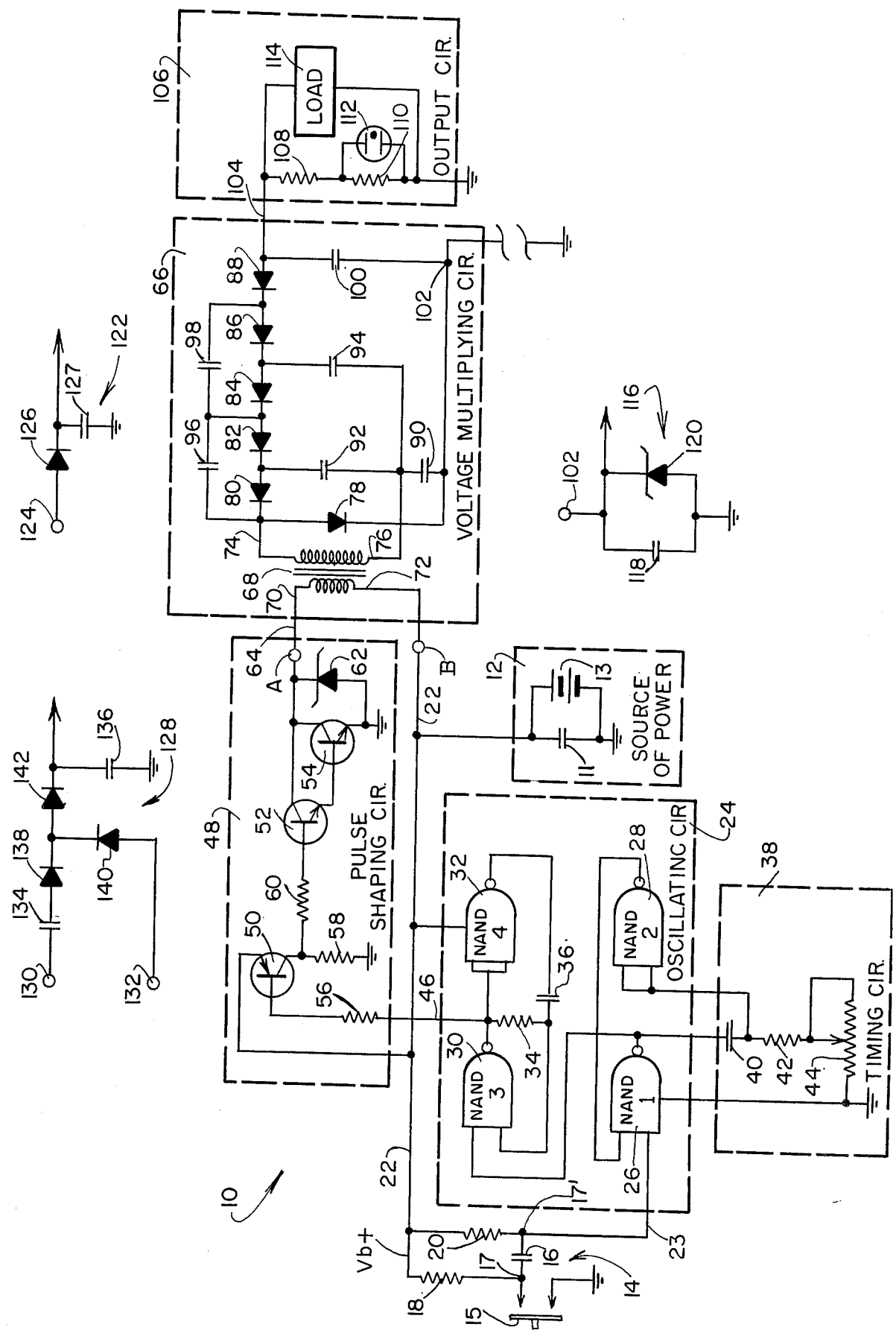

CORONA POWER SUPPLY CIRCUIT

CROSS-REFERENCE TO RELATED APPLICATIONS

This application is a continuation of application Ser. No. 532,713, filed Dec. 13, 1974, now abandoned, which is a continuation-in-part of my patent application Ser. No. 378,136 filed July 11, 1973, now abandoned, and assigned to the assignee of this application.

Reference is made herein to copending patent application Ser. No. 260,848, filed June 8, 1972, entitled "ELECTRO-PHOTOGRAPHIC FILM"; to copending continuation-in-part patent application of said first mentioned case, Ser. No. 323,132, filed Jan. 12, 1973, entitled "ELECTROPHOTOGRAPHIC FILM AND METHOD OF MAKING AND USING THE SAME"; and to copending patent application, Ser. No. 323,108 filed Jan. 12, 1973, entitled "METHOD AND APPARATUS FOR PROCESSING ELECTROSTATIC IMAGES," all of said copending applications being assigned to the assignee of this application.

BACKGROUND OF THE INVENTION

This invention relates to power supply circuits for use in portable electrophotographic apparatus and more particularly, to a portable, modular corona power supply circuit of the high-voltage low-current type for use in such apparatus.

In the field of xerographic or electrostatic image recording, a latent image is formed on a plate having a photoconductive surface. This latent image is the pattern which is projected onto the plate by a lens system or other suitable means. Prior to projection, the plate is subjected to a corona discharge to provide a large number of electrons at or near the photo-conductive surface which are capable of migrating when bombarded by photons.

An apparatus for processing images utilizing electrophotographic film is described in detail in the copending applications. The electrophotographic film is comprised of a substrate of polyester or the like carrying an ohmic layer bonded thereto and an inorganic photoconductive coating is bonded to the surface of the ohmic layer. The film is exposed to a corona discharge which is formed when an electrode is subjected to a voltage on the order of 6000 volts; the electrode being adjacent said film.

The corona discharge results in a charge of electrons on or near the surface of the photoconductive coating; exposure to a light pattern causes a patterned discharge of the electrons to produce a latent image; the application of toner particles to the surface results in a variegated adherence of particles. Thus, a visible image is formed by the patterned adhesion of toner particles to the surface of the photoconductor.

Given the necessity of building a small handheld camera type of device for producing the electrostatic record, a small low power consumption power supply circuit of the type capable of supplying corona voltages also would be required. Such prior art supplies were complex, bulky, expensive and not easily adaptable for portable use as would be required in a camera of the above type. So far as known, prior corona voltage circuits continuously were connected to the power source, making them difficult to use with low energy sources, such as for example dry cell batteries. Those which may not have been continuously connected employed oscillator power supplies which made no attempt at minimizing current drain or power consumption.

Prior art power supply circuits overstressed the active elements within the power supply causing component failure and/or break down or "run away" of the circuit when the corona load at the output of the power supply varied from a load to a "no load" condition.

In toning prior electrostatic plates or members, the toner tends to migrate to the edges of areas which were fully charged so that an edge effect occurs. According to the disclosures of the copending application Ser. No. 323,108, a D.C. bias is utilized to drive the toner particles to the photoconductive surface and provide for uniform distribution thereof over the surface. This obviates edge effect. The circuit of the invention herein also provides the positive voltage to be used for such bias.

SUMMARY OF THE INVENTION

In practicing this invention, a power supply circuit is provided which operates from a portable source of D.C. voltage. An oscillating circuit coupled to said source of D.C. voltage develops an A.C. signal comprised of a series of pulses when energized. The oscillating circuit includes a timing circuit which inhibits the series of pulses after a predetermined period of time. A pulse shaping circuit is provided for shaping said series of pulses and supplying the shaped series of pulses to the voltage multiplying circuit through a transformer. The pulse shaping circuit draws operating current from the source of voltage only during the presence of each pulse. The multiplying circuit multiplies the voltage induced in the transformer to develop the corona voltage and draws no power from the source of D.C. voltage. The multiplying circuit can be designed to provide both a high negative corona voltage and a low positive bias voltage.

BRIEF DESCRIPTION OF THE DRAWING

The single FIGURE is a schematic diagram of a corona power supply circuit embodying the features of this invention.

DETAILED DESCRIPTION OF THE PREFERRED EMBODIMENT

The power supply circuit in the single figure is generally designated by the reference numeral 10. A power source 12 includes a battery 13 having a filter capacitor 11 coupled in parallel. A switching circuit for energizing the power supply circuit is generally indicated at 14 and comprises an initiate switch 15, a capacitor 16 and resistors 18 and 20. The power source 12 is coupled via conductor 22 and resistor 18 to one contact terminal of the initiate switch 15 at junction 17. Resistor 20 is connected between conductor 22 and one terminal of capacitor 16 at junction 17', capacitor 16 being coupled between junction 17 and junction 17'. The contact terminal of switch 15 is connected to ground potential.

Prior to the closing of switch 15, both terminals of capacitor 16 are maintained at the positive voltage of power source 12, hereinafter designated as $+V_b$ by the connections through resistors 18 and 20 and conductor 22. This positive voltage, which is known as a "high state signal" in discussions of logic circuit operation, is coupled from junction 17' to oscillating circuit 24 by conductor 23. When switch 15 is closed, junction 17 and one terminal of capacitor 16 and resistor 18 are coupled to ground potential. This causes the voltage at junction 17' to instantaneously go negative and approach ground potential, thus developing a low state signal. This ground potential is coupled from junction 17' to oscillating circuit 24 by conductor 23.

Oscillating circuit 24 is a complimentary metal oxide semi-conductor (C-MOS) integrated circuit chip comprised of four NAND logic gates 26, 28, 30 and 32. Each of the NAND gates has first and second inputs and an output. Coupled between the output of NAND gate 26 and the common input terminal formed by the first and second inputs of NAND gate 28 is a timing circuit 38 comprised of a capacitor 40, a resistor 42, and a variable resistor 44. Capacitor 40 has one terminal coupled to the output of NAND gate 26 and the other terminal coupled to one terminal of resistor 42. The other terminal of resistor 42 is coupled to the wiper of variable resistor 44. One terminal of variable resistor 44 is coupled to the wiper and the other terminal is coupled to ground potential. The common input to NAND gate 28 is coupled to the junction of capacitor 40 and resistor 42. One terminal of a resistor 34 is coupled to the output of NAND gate 30 and the other terminal is coupled to a first input thereof. A capacitor 36 is coupled in series between the output of NAND gate 32 and the first input to NAND gate 30. Gates 26 and 28, along with timing circuit 38, are coupled to form a monostable multivibrator which operates in circuit as a timer and gates 30 and 32, resistor 34 and capacitor 36 are coupled to form an astable multivibrator which operates in circuit as an oscillator. NAND gates 26, 28, 34 and 36 themselves operate in the following manner. When a high or positive voltage appears at both inputs to a NAND gate, the output of the gate is a low state signal. For all other combinations of high and low state signals at the input to the NAND gate the output thereof will be a high state signal.

As previously noted the output of switching circuit 14 is coupled to oscillating circuit 24 by conductor 23. Conductor 23 is coupled to one input of NAND gate 26. The second input of gate 26 is coupled to the output of gate 28. Prior to closing switch 15 a positive voltage appears on line 23. Assuming no charge is stored on capacitor 40, resistors 42 and 44 are at approximately ground potential thereby providing a low signal input to gate 28 so that the output is a high state signal. Since both inputs to gate 26 are high, a low output signal is developed at the output of gate 26.

When switch 15 is closed and a negative voltage is coupled to the input of NAND gate 26, the output of gate 26 will switch from a low to a high state. The high signal at the output of gate 26 will cause capacitor 40 to begin to charge and instantaneously develop a positve voltage at the junction of capacitor 40 and resistor 42. The positive voltage is coupled to the inputs of gate 28 causing the output of gate 28 to switch from a high to low state. This low state at the output of gate 28 is coupled to the second input of gate 26 so that gate 26 maintains a high condition at its output regardless of the voltage coupled to the first input on conductor 23. At this time gate 26 is effectively "latched on ". As capacitor 40 charges the voltage at the output of gate 26, the junction of capacitor 40 and resistor 42, will begin to decrease and approach zero volts. The time for this to occur is determined by the capacitance of capacitor 40 and the resistance of resistors 42 and 44, this time being adjustable by varying the total resistance of resistor 44. When this occurs, the output of gate 28 changes from a low to a high state which causes the second input of gate 26 to change to a high state and the output of gate 26 to change to a low state. Of course, this assumes that the voltage at the first input to gate 26, conductor 23, has returned to a positive value and that switch 15 has not been closed to again discharge capacitor 16. A timed high state signal is provided at the output of gate 26 by this operation. In the preferred embodiment, the period of this high state signal is approximately 300 milliseconds.

The output of gate 26 is coupled to a second input of gate 30 so that for the 300 milliseconds after actuation of switch 15 a high state signal is coupled thereto. At all other times a low state signal is coupled to the second input of gate 30. When a low state signal appears at the second input to gate 30 from the output of gate 26, the astable formed by gates 30 and 32 is held in a stable or inoperative state with the output of gate 30 maintained in a high state and the output of gate 32 maintained in a low state. When in this mode of operation, no oscillations are produced at the output of gate 30, and NAND gates 26, 28, 30 and 32 draw a minimum current from battery 13.

When gate 26 is latched on and a high state signal is coupled to the second input of gate 30, the output of gate 30 will switch from a high to low state. This causes the output of gate 32 to change to a high state and capacitor 36 to begin reverse charging. The voltage at the junction of capacitor 36 and the resistor 34 will decrease toward zero or the low state at a rate determined by the component values of resistor 34 and capacitor 36. When the voltage at this junction reaches a predetermined value, gate 30 will effectively see a low state signal at the first input. This low state signal input will cause gate 30 to change states and develop a high state signal at its output. The high state signal now coupled to the input of gate 32 will cause its output to change from a high to a low state which causes capacitor 36 to begin charging in the other direction. Now the voltage at the junction of capacitor 36 and resistor 34 begins increasing at a rate determined as noted above. When the voltage at the junction reaches a predetermined value, gate 30 will effectively see a high state signal at the first input again causing gate 30 to change states and develop a low state signal at its output. The cycling described will continue as long as the second input to gate 30 remains high, producing oscillations at the output of gate 30 in the form of a train of square wave signals which shift between a high and low state. In the preferred embodiment, the oscillation frequency is approximately 5 KHz. Because of the C-MOS construction, relatively little current is drawn by oscillating circuit 24 even when latched on and oscillating. It should be noted at this point, however, that the operating frequency of oscillating circuit 24 will vary in accordance with the component of values employed. With a 5 KHz oscillation frequency variations as much as ± 1 KHz can occur with normal variations in component value. The variations in supply voltage, however, have little effect on the frequency because of the basic operating characteristics of the integrated circuit employed.

Conductor 46 couples the output of oscillating circuit 24 to pulse-shaping circuit 48. Pulse-shaping circuit 48 is comprised of a current limiting resistor 56 coupled to the base electrode of a PNP transistor 50. The emitter of transistor 50 is coupled to the source of power 12 by conductor 22 and the collector electrode of transistor 50 is coupled through resistor 58 to ground potential. The collector of transistor 50 is also coupled through resistor 60 to the base electrode of transistor 52. Transistors 52 and 54 are coupled in what is commonly known as a Darlington configuration with the collector electrode of transistor 52 coupled to the collector electrode of transistor 54 and the emitter electrode of transistor 52 coupled to the base electrode of transistor 54. The emitter electrode of transistor 54 is coupled to ground potential. The Darlington configuration provides substantial current gain in order to allow passage of substantial current from collector to emitter of transistor 54 when transistors 52 and 54 are turned on. Coupled to the collector electrode of transistor 54 is the cathode of a spike or high voltage protection Zener diode 62, the anode thereof being coupled to the emitter of transistor 54. The collector electrode of transistor 54 also is coupled to the primary of a step-up transformer 68 at 70 via conductor 64. The other terminal 72 of the primary winding is coupled via conductor 22 to the source of power 12.

When no oscillations are developed by oscillating circuit 24 and for one-half of each oscillation cycle when oscillations occur, the output of gate 30 is a low state signal of approximately zero volts, as previously explained. This zero volt signal is coupled by conductor 46 and resistor 56 to the base of transistor 50. With supply voltage coupled to the emitter and zero volts coupled to the base, transistor 50 will be reverse biased and turned off during these time periods. When transistor 50 is reverse biased, a voltage will not be developed across resistor 58 and transistors 52 and 54 will be reverse biased or off. When transistors 50, 52 and 54 are reverse biased, substantially no current will be drawn by pulse-shaping circuit 48. For the other half of each oscillation cycle when oscillations occur, the output of gate 30 is a high state signal which is coupled by conductor 46 and resistor 56 to the base of transistor 50. This high state signal is of sufficient amplitude to forward bias transistor 50 causing it to conduct current and develop a voltage across resistor 58. This voltage is coupled through resistor 60 to the base of transistor 52 forward biasing transistors 52 and 54 and rendering them conductive. With transistor 54 conductive, a saturation current will be drawn from battery 13 through the primary of transformer 68 via conductor 22 connected to terminal 72, and from transformer 68 through the collector and emitter of transistor 54 to ground potential via the conductor 64 connected to terminal 70. This saturation current will cause saturation of transformer 68. As the saturation current is drawn only for one-half of each oscillation cycle, when the oscillations occur, and they occur for a short fixed period after operation of switch 15, relatively little total current is drawn by pulse-shaping circuit 48 allowing use of a relatively small low capacity battery. Furthermore, by connecting pulse-shaping circuit 48 directly to a source of supply rather than supplying full operating power from the oscillator, the output developed by power supply circuit 10 will remain constant, notwithstanding substantial variation in the frequency of oscillating circuit 24. The basis for this statement will be explained subsequently. However, it should be noted that this allows much greater tolerance in component values selected resulting in a lower component cost and a lower cost, mass producible power supply.

In the preferred embodiment, transformer 68 has a turns ratio of approximately 50:1 so that the voltage induced across the secondary between terminals 74 and 76 is stepped up from the voltage developed across the primary of transformer 68. Each time a saturation current is passed through the primary winding saturating transformer 68, approximately 1,000 volts is induced across the secondary between terminals 74 and 76. When transistor 54 is cut off on the alternate half of each oscillation cycle and the current through the primary of transformer 68 is terminated, the magnetic field and energy therein developed by saturation of transformer 68 will attempt to maintain itself and will induce an opposite polarity high energy voltage across the secondary between terminals 74 and 76. This will decrease to zero within a predetermined time T, then increase again in the positive direction, oscillating or ringing. The frequency of oscillation of oscillating circuit 24 is selected such that one-half cycle has a period $T_1$ which is less than T. This maximizes the energy transferred from the magnetic field and developed across the secondary both in response to saturation of transformer 68 and cutoff of saturation currents. As long as one-half of each oscillation cycle has a period which is either less than T or long enough to allow substantially maximum energy transfer into the secondary, the over-all efficiency of the power supply will be maintained. This means that the frequency of oscillating circuit 24 can vary greatly within the above defined limits without having any substantial effect on the power supply efficiency.

A voltage-multiplying circuit 66 is coupled to terminals 74 and 76 of the secondary of transformer 68 and comprises six diodes 78, 80, 82, 84, 86 and 88; and six capacitors 90, 92, 94, 96, 98 and 100. Capacitors 90, 92 and 94 each have one terminal thereof coupled together and to terminal 76. The cathode of diode 80, the anode of diode 78 and one terminal of capacitor 96 are coupled to terminal 74. The anode of diode 80, the cathode of diode 82 and the second terminal of capacitor 92 are coupled together. The second terminal of capacitor 96, one terminal of capacitor 98, the anode of diode 82 and the cathode of diode 84 are coupled together. The anode of diode 84, the cathode of diode 86 and the second terminal of capacitor 94 are coupled together; and the anode of diode 86, the cathode of diode 88 and the other terminal of capacitor 98 are coupled together. The anode of diode 88 and one terminal of capacitor 100 are coupled together, and the second terminal of capacitor 100, the second terminal of capacitor 90 and the cathode of diode 78 are coupled together at a terminal 102. For a discussion of the voltage-multiplying circuit operation, assume that terminal 102 is coupled to ground potential.

Operation of voltage multiplying circuit is as follows. For purposes of this explanation we will assume a voltage E is induced across the secondary of transformer 68. When the voltage induced across the secondary is such that terminal 74 is positive and 76 is negative, terminal 74 will be grounded via the path through forward biased diode 78, and capacitor 90 will charge to −E. When the induced voltage across the secondary next reverses, terminal 74 will become positive and 76 negative. The secondary will be in series with the −E charge developed across capacitor 90 so that the effective voltage at terminal 74 becomes −2E. The forward biases diode 80 so that capacitor 92 will charge from the secondary. Capacitors 90 and 92 are series connected so that the voltage developed at the junction of diodes 80 and 82 and capacitor 92 will be −2E. With the next voltage reversal across the secondary terminal 74 becomes positive and is again grounded through diode 78 and terminal 76 becomes negative again recharging capacitor 90 to −E. Diode 82 will now be forward biased alowing capacitor 96 to receive charge from capacitors 90 and 92 and charge to −2E. Upon the next voltage reversal terminal 74 will become negative with a voltage of −2E with respect to ground. This will be in series with the 2E charge across capacitor 96. This will forward bias diode 84 allowing capacitor 94 to charge to −4E. When the voltage across the secondary again reverses terminal 74 will become positive and be grounded through diode 78 and terminal 76 will be negative recharging capacitor 90 to −E. This will cause the voltage at the junction of diodes 82 and 84 and capacitors 96 and 98 to decrease to −2E; however, the charge on capacitor 94 will remain at −4E because diode 84 is reverse biased preventing discharge. With a −4E charge on capacitor 94 diode 86 will be forward biased allowing the charge to be transferred to capacitor 98. Capacitor 98 will then charge to −2E, −2E being developed across capacitor 96. This will result in a voltage of −4E being developed at the junction of diodes 86 and 88 and capacitor 98. On the next voltage reversal terminal 74 again will become negative with a voltage of −2E with respect to ground. Terminal 74 will be in series with −2E charge on capacitor 96 and the −2E charge on capacitor 98 so that a voltage of −6E appears at the junction of diodes 86 and 88 and capacitor 98. Diode 88 will be forward biased by this −6E charge allowing capacitor 100 to charge to −6E. On the next voltage reversal terminal 74 again becomes positive and will be grounded through diode 78. With terminal 76 negative capacitor 90 will again recharge to −E. Capacitors 96 and 98 appear in series via the grounding of terminal 74 so that the voltage at the junction of diodes 86 and 88 reduces to −4E. Diode 88 is reverse biased under these conditions preventing the discharge of capacitor 100 into capacitors 98 and 96. This results in a voltage of −6E being maintained across capacitor 100 and at conductor 104. In the preferred embodiment the voltage induced across the secondary is 1000 volts so that 6000 volts is developed at conductor 104. Capacitor 100, in addition to being able store the charge for the period of a cycle, also acts as a filter eliminating any undesired pulses at conductor 104. The multiplying circuit 66 then is a voltage sextupler developing the necessary corona output voltage for power supply circuit 10.

It should be noted that multiplying circuit 66 has no connection to battery 13. The entire charge voltage is developed from the voltage induced in transformer 68 so that no additional current or power is derived from battery 13 other than that used to operate pulse-shaping circuit 48 and oscillating circuit 24. In both of these circuits the power consumption and current drain is minimized as previously noted.

An output circuit 106 is coupled to the output of multiplying circuit 66 by conductor 104. The output circuit is comprised of resistors 108 and 110 series connected between conductor 104 and ground potential. A neon lamp 112 is connected across resistor 110. The lamp 112 has a firing voltage of approximately 80 to 90 volts. Resistors 108 and 110 are chosen to be of very high resistance and the ratio between them chosen such that when the voltage across resistor 110 is sufficient to fire lamp 112, the corona output voltage appearing on conductor 104 will be greater than 3,000 volts. The firing of lamp 112 signifies that the power supply circuit 10 has developed a voltage sufficient to create a desired corona.

A load 114 in output circuit 106 is coupled from conductor 104 to ground potential across resistors 108 and 110. Load 114 represents the resistance of the corona electrode that is positioned adjacent the electrophotographic film to which the corona discharge from the corona electrode is to be coupled. The large corona voltage coupled to the load 114 produces an ionization of air at the surface of the film which is necessary for charging the surface thereof in a manner described in the previously-mentioned copending applications.

Should output circuit 106 or load 114 be disconnected the voltage multiplying circuit 66 and the high energy magnetic field in transformer 68 can cause the voltage at terminal 70 to rise to a voltage which would damage or destroy transistors 52 and 54. To protect against this occurrence, Zener diode 62 is provided to limit the voltage developed across the collector-emitter junction of transistor 54 to under the breakdown voltage of transistor 54. For example, of the breakdown voltage of transistor 54 is 50 volts, Zener diode 62 will be chosen to be a VR 47A type Zener which has a breakdown voltage of approximately 47 volts.

Once the corona voltage is applied to the load 114, a bias potential is also needed to be supplied to the toner exiting surface as described in copending application, Ser. No. 323,108. This bias voltage can be taken from any number of places, three of which will be described.

A D.C. bias circuit generally designated in the Figure as 116 is comprised of a capacitor 118 and a Zener diode 120 coupled in parallel, the cathode of diode 120 being the output of circuit 116. In this embodiment, the cathode of diode 120 can be coupled between terminal 102 of voltage multiplying circuit 66 and ground. Terminal 102 can then be coupled to the toner exiting surface (not shown). The Zener breakdown voltage determines the bias voltage at the cathode of the diode. For example, if the breakdown voltage of diode 120 is 47 volts, a 47 volt D.C. bias will be provided at terminal 102. Because the current return is through Zener diode 120 from terminal 102 to ground the voltage at terminal 102 is positive with respect to ground. The positive D.C. bias therefore is derived at the expense of the corona high voltage. In this embodiment, the corona voltage is reduced by less than 1 percent so that there is a negligible effect upon the corona voltage applied to load 114. The capacitor 118 is of small capacitance of approximately 10 nanofarads ($10 \times 10^{-9}$ farads) and serves to protect Zener diode 120 against damage due to spikes or arc-overs which sometimes occur at the high corona voltages.

A second bias circuit is generally indicated in the Figure by the numeral 122 and is comprised of terminal 124, diode 126 and capacitor 127. Capacitor 127 is coupled between ground and the cathode of diode 126. The anode of diode 126 is coupled to terminal 124. Terminal 124 can be coupled to terminal A which is found in the pulse-shaping circuit 48 and located at the cathode of Zener diode 62. The output of the second bias circuit 122 is located at the cathode of diode 126. Due to the voltage across the primary windings of transformer 68 and the back EMF produced by the field collapse of transformer 68, an induced voltage appears at the cathode of Zener diode 62 and, with the voltage of battery 13, and the voltage appearing across terminals 70 and 72, a total voltage of approximately 30 volts appears at the cathode of diode 62. This total voltage is coupled through diode 126 to charge up capacitor 127 thereby providing a bias voltage of approximately 30 volts at the cathode of diode 126.

A third bias circuit generally indicated in the Figure by the numeral 128 is comprised of input terminals 130, 132, capacitors 134 and 136 and diodes 138, 140 and 142. Terminal 130 can be coupled to terminal A and terminal 132 can be coupled to the battery 13 at terminal point B on conductor 22. Capacitor 134 is coupled between the anode of diode 138 and terminal 130. The cathodes of diodes 138 and 140 form a common terminal with the anode of diode 148. The anode of diode 140 is coupled to terminal 132 and the cathode of diode 142 is coupled to capacitor 136 which is coupled between the cathode of diode 142 and a source of reference potential and ground. The output of the third bias circuit 128 is at the cathode of diode 142. Terminal 132 is at a value $+V_b$ due to the coupling of battery 13 thereto. When transistor 54 is forward biased the collector electrode is pulled down to approximately ground potential. Terminal 130 also is pulled down allowing capacitors 134 and 136 to charge to approximately $+V_b$. When transistor 54 is turned off, the total voltage of approximately 30 volts is transferred through capacitor 134 via diode 138 and 142 to capacitor 136 and adds 30 volts of charge to that already accumulated on capacitor 136. Capacitor 134 is prevented from discharging due to the reverse bias on diode 140. A D.C. bias voltage of approximately 42 volts is thereby provided at the cathode of diode 142.

The elements comprising the power supply circuit 10 when properly coupled to each other form a module of approximately 1 × 1 × 1¼ inches. This ability of circuit 10 to be so miniaturized provides the added advantage of reducing the bulkiness of the portable electrophotographic apparatus for which it was designed as well as the over-all cost of the apparatus. The variable resistor 44 which controls the time that the pulses are produced by oscillating circuit 24 has the added advantage of providing an easy adjustment for the amount of time that the corona voltage is to be applied to the load 114. This is necessary because the corona charge time varies with different types of electrophotographic film used.

A corona power supply circuit 10 which operates successfully utilizes the following components and component values.

| | |
|---|---|
| transistor 50 | 2N3906 |
| transistor 52 | 2N3904 |
| transistor 54 | 40D5/7 |
| C-MOS integrated circuit 24 | CD 4011AE |
| resistors 18,20 | 12,000 ohms |
| resistor 34 | 150,000 ohms |
| resistor 42 | 47,000 ohms |
| resistor 44 | 1,000,000 ohms-variable |
| resistor 56 | 37,000 ohms |
| resistor 58 | 10,000 ohms |
| resistor 60 | 2,700 ohms |
| resistor 128 | 40,000,000 ohms |
| resistor 110 | 3,300,000 ohms |
| diodes 78,80,82,84, 86,88 | MR 994A |
| diodes 126,138,140, 142 | IN 4002 |
| diodes 62,120 | VR 47A-Zener |
| Capacitor 15 | 22 microfarads 16.V.T.E. |
| capacitors 16,127, 134,136 | .1 microfarads 50V.CD. |
| capacitor 40 | 3.3 microfarads 16 V.T.E. |
| capacitor 36 | .001 microfarads 16 V.T.E. |
| capacitors 90,92,94, 96,98 | .0033 microfarads 3KV |
| capacitor 100 | .0015 microfarads 6KV |
| transformer 68 | TRIAD TY 62X |
| battery 13 | 12 V.D.C. (Dry Cell) |
| neon bulb 112 | NE-2 V1 |

The above elements for power supply circuit 10 can provide load 114 via lead 104, approximately 200 microamps of current at approximately 6,000 volts D.C. for a period that can vary from one-third second to approximately 1 second. The above parameters are given by way of example only and are not intended to limit the scope of the invention.

What is desired to secure by Letters Patent of the United States is:

1. A compact high voltage corona power circuit for charging the photoconductive surface of an electrophotographic member and comprising
   A. a source of D.C. voltage,
   B. an oscillator connected to said source to be energized thereby,
      i. said oscillator being of a construction having an inherently small power drain, and
      ii. adapted when triggered by a suitable signal to become enabled whereby to produce a series of pulses,
   C. a trigger circuit
      i. arranged to be operated as desired to produce a trigger signal and
      ii. coupled to said oscillator so that the trigger signal when produced will initiate the production of said series of pulses,
   D. a timer associated with the oscillating circuit and arranged to control the number of pulses in the series and acting to disable the oscillator and stop the oscillation when said number of pulses has been produced,
   E. a pulse shaper connected to the source and coupled to the oscillator to receive as an input said series of pulses and having an output, said pulse shaper
      i. being constructed to convert the said pulses into transformable signals,
      ii. being directly connected to said source and absorbing substantial power from the source during its operation,
      iii. having circuitry keeping the same inoperative except upon receipt of said series of pulses from said oscillator and then only for a fraction of each cycle of said pulses, whereby to minimize energy drain from said source,
   F. a voltage multiplying circuit coupled to and responsive to the output of said pulse shaper to raise the amplitude of the transformable signals substantially and
   G. corona producing means connected to and driven by said voltage multiplying circuit.

2. A compact high voltage corona power circuit as claimed in claim 1 which includes a D.C. bias circuit coupled to said voltage multiplying circuit for providing a source of D.C. bias whose D.C. voltage is greater than the voltage of said source D.C. voltage.

3. A compact high voltage corona power circuit as described in claim 1 wherein said oscillator incluldes:
   A. a monostable multivibrator and;

B. an astable multivibrator coupled to said monostable multivibrator which is enabled to produce the series of pulses.

4. A compact high voltage corona power circuit as claimed in claim 3 wherein said timer is coupled to said monostable multivibrator and provides a signal to enable said astable multivibrator circuit, the amplitude of said signal varies with time such that when said signal reaches a predetermined voltage at a predetermined period of time, said monostable multivibrator changes state and thereby disables said astable multivibrator.

5. A compact high voltage corona power circuit as claimed in claim 1 wherein said source of D.C. voltage includes a dry cell battery.

6. A compact high voltage corona power circuit as claimed in claim 1 wherein said pulse shaper includes a unidirectional current conducting device coupled between the output of said pulse shaper and a source of reference potential to protect said pulse shaper from breaking down.

7. An apparatus for producing a corona voltage on a corona load and for providing a D.C. bias voltage, comprising:
A. a portable source of D.C. voltage;
B. an oscillating circuit having an input and an output, said oscillating circuit providing at its output one of a predetermined number of pulses and a series of pulses for a predetermined period of time;
C. a pulse-shaping circuit, for shaping the series of pulses from said oscillating circuit, said shaping circuit having an input and an output;
D. a voltage-multiplying circuit having an input and an output for providing a high D.C. voltage at its output, said voltage multiplying circuit multiplying the series of pulses coupled to the input thereof and said voltage multiplying circuit operative only when said series of pulses is present;
E. a switching circuit for coupling and decoupling said source of D.C. voltage to said oscillating circuit; and
F. an output circuit comprising an electrode adjacent a corona load, the corona voltage produced at the output of said voltage multiplying circuit being applied to said electrode to produce a corona discharge near said corona load.

8. An apparatus as claimed in claim 7 which includes a D.C. bias circuit coupled to said voltage multiplying circuit and operative in response to the voltage produced at the output of said voltage multiplying circuit to develop a D.C. bias whose D.C. voltage is greater than the voltage of said source of D.C. voltage.

9. An apparatus as claimed in claim 7 wherein said oscillating circuit includes:
A. a monostable multivibrator;
B. a time circuit coupled to said monostable multivibrator and operative to cause said monostable multivibrator to change state after a predetermined period of time; and
C. an astable multivibrator coupled to said monostable multivibrator which is caused to produce said series of pulses for said predetermined period of time.

10. An apparatus as claimed in claim 9 wherein said pulse-shaping circuit is comprised of first, second and third transistors, each having base, collector and emitter electrodes; the base electrode of said first transistor coupled to the output of said oscillating circuit, the emitter electrode thereof coupled to said source of D.C. voltage and the collector electrode thereof coupled to the base electrode of said second transistor and also coupled through a collector resistive device to a source of reference potential, the collector electrode of said second transistor coupled to the collector electrode of said third transistor coupled to the collector electrode of said third transistor, the emitter electrode of said second transistor coupled to the base electrode of said third transistor and the emitter electrode of said third transistor coupled to said source of reference potential, and the output of said shaping circuit being the collector electrode of said third transistor.

11. An apparatus as claimed in claim 10 wherein said output circuit further includes:
A. first and second high impedance devices coupled together in series and in parallel to the output of said voltage multiplying circuit;
B. a voltage sensing means coupled in parallel to said second high impedance device, and sensing the voltage thereof; said voltage sensing means operative to produce a visible signal when the voltage across said second high impedance device reaches a threshold voltage.

12. A compact high voltage corona power circuit for charging the photoconductive surface of an electrophotographic member and comprising:
A. a source of D.C. voltage;
B. an oscillator connected to said source to be energized thereby comprising,
 i. a timer,
 ii. a monostable multivibrator
 iii. an astable multivibrator, said monostable multivibrator and said astable multivibrator formed on an integrated circuit to have an inherently small power drain;
 iv. said astable multivibrator, when enabled, oscillating to produce a series of pulses;
 v. said timer coupled to control the number of pulses in the series and acting to disable said astable multivibrator and stop the oscillations when said number of pulses have been produced;
C. a pulse shaper connected to the source of D.C. voltage and coupled to the oscillator to receive as its inputs a series of pulses and said pulse shaper having an output, and comprising;
 first, second and third transistors, each having base emitter and collector electrodes;
 said first transistor having its base electrode coupled to said astable multivibrator and having its emitter electrode coupled to said source of voltage;
 an impedance device coupled between the collector electrode of said first transistor and a source of reference potential;
 said second transistor having its base electrode coupled to the collector electrode of said first transistor, the collector electrode of said second transistor forming a common terminal with the collector electrode of said third transistor and the emitter electrode of said second transistor coupled to the base electrode of said third transistor;
 said collector electrode of said third transistor coupled to form said output of said pulse shaper and the emitter electrode of said third transistor coupled to the source of reference potential or ground;

D. a voltage multiplying circuit coupled to and responsive to the output of said pulse shaper to raise the amplitude of signals coupled thereto from said pulse shaper; and E. corona producing means connected to and driven by said voltage multiplying circuit.

13. A compact high voltage corona power circuit as claimed in claim 12 wherein a D.C. bias circuit is coupled to said voltage multiplying circuit and provides a source of D.C. bias whose D.C. voltage is greater than the voltage of said source of voltage; and said first, second and third transistors are respectively PNP, NPN, and NPN type transistors.

14. A portable power supply for producing a high corona voltage including in combination;

input means connectible to a source of D.C. voltage for receiving operating current and voltage therefrom, oscillator means coupled to said input means and operative to develop oscillations in response to connection to said source of D.C. voltage, pulse-shaper means coupled to said oscillator means and said input means and operative to develop a first voltage pulse having one polarity in response to a first half of each cycle of said oscillations and to develop a second voltage pulse having the opposite polarity during the second half of each cycle of said oscillations, said pulse-shaper means being operative to draw substantially all operating current during said first half of each cycle of said oscillations and substantially no operating current during the second half of each cycle of said oscillations, and multiplier means coupled to said pulse-shaper means and operative only in response to said first and second voltage pulses coupled thereto to develop said corona voltage.

15. The power supply of claim 14 wherein said pulse-shaper means include, switch means coupled to said oscillator means and transformer means coupled to said switch means and said input means, said switch means operative in response to said first half of each cycle of oscillations to turn on drawing operating current therethrough and saturation current therethrough and through said transformer means, said switch means operative in response to each second half cycle of oscillations to turn off drawing substantially no operating current and terminating said saturation current therethrough and through said transformer means, said transformer means responsive to said saturation currents to develop said first voltage pulse and operative in response to said saturation current termination to develop said second voltage pulse.

16. The power supply of claim 15 wherein said transformer means include a transformer having primary and secondary windings, said primary windings being coupled in series between said input means and said switch means, said first and second voltage pulses being developed across said secondary winding.

17. The power supply of claim 16 wherein said transformer saturates in response to said saturation current and induces said first voltage pulse across said secondary, said transformer inducing said second voltage pulse across said secondary winding in response to termination of said saturation current.

18. The power supply of claim 15 wherein said switch means include a first semiconductor means coupled to said oscillating means and said input means, said first semiconductor means being normally nonconductive and being operative only in response to said first half of each cycle of said oscillations to conduct, second semiconductor means coupled to said first semiconductor means and said transformer means and operative only in response to conduction of said first semiconductor means to draw said saturation current therethrough and through said transformer means.

19. The power supply of claim 18 wherein said transformer means includes a transformer having a primary and secondary winding, said primary winding being coupled in series between said second semiconductor means and said input means, said first and second voltage pulses being developed across said secondary winding.

20. The power supply of claim 19 wherein said transformer saturates in response to said saturation current and induces said first voltage pulse across said secondary, said transformer inducing the second voltage pulse across said secondary winding in response to termination of said saturation currents.

21. The power supply of claim 18 wherein said first semiconductor means includes a first transistor and said second semiconductor means includes second and third transistors arranged in a Darlington configuration.

22. The power supply of claim 21 wherein said second semiconductor means include voltage protection means coupled across said Darlington configuration for protecting same from excessive voltage.

23. The power supply of claim 15 further including bias circuit means coupled to said switch means and operative to develop a bias voltage.

24. The power supply of claim 14 further including corona producing load means coupled to said multiplier means and operative in response to receipt of said corona voltage to develop said corona.

25. The power supply of claim 14 wherein said multiplier means include a voltage sextupler.

26. The power supply of claim 25 wherein said sextupler develops a negative voltage at the output thereof and further includes bias circuit means for developing a positive bias voltage.

27. The power supply of claim 14 wherein said oscillator means include oscillation circuit means coupled to said pulse-shaper means and operative to develop said oscillations when enabled, and timer circuit means coupled to said oscillation circuit means and operative to enable said oscillation circuit means for said predetermined time period.

28. The power supply of claim 27 wherein said timer circuit means include time initiation means for initiating said timer circuit means, said timer circuit means developing an enable signal for said predetermined time period to enable said oscillation circuit means for said predetermined time period.

29. The power supply of claim 28 wherein said time initiation means include a manual operation switch.

30. The power supply of claim 29 wherein said timer circuit means is a monostable multivibrator and said oscillation circuit means is an astable multivibrator.

31. A power supply circuit for producing a high corona voltage including in combination;

input means connectible to a source of D.C. voltage for receiving operating current and voltage therefrom, timing circuit means coupled to said input means and operative to develop an enable signal for a predetermined time period, oscillation circuit means coupled to said input means and said timer circuit means and operative in response to said enable signal to develop substantially square wave signals for said predetermined time period, switch means coupled to said oscillation circuit means and transformer means coupled to said switch means and said input means, said switch means operative in response to a first half of each cycle of said oscillations to turn on drawing operating current and saturation curent therethrough and through said transformer means, said switch means operative in response to said second half cycle of oscillations to turn off drawing substantially no operating current therethrough and terminating saturation current therethrough and through said transformer means, said transformer means operative in response to said saturation current to develop a first voltage pulse and operative in response to said saturation termination to develop a second voltage pulse, multiplier means coupled to said transformer means and operative only in response to said first and second voltage pulses coupled thereto to develop said corona voltage, and corona producing load means coupled to said multiplier means and operative in response to receipt of said corona voltage to develop said corona.

32. A portable power supply for producing a high corona voltage including in combination;

input means connectible to a source of D.C. voltage for receiving operating current and voltage therefrom, oscillator means coupled to said input means and operative to develop oscillations in response to connection to said source of D.C. voltage, pulse-shaper means coupled to said oscillator means and said input means and operative to develop a first voltage pulse having one polarity in response to a first half of each cycle of said oscillations and to develop a second voltage pulse having the opposite polarity during the second half of each cycle of said oscillations, said pulse-shaper means being operative to draw substantially all operating current during said first half of each cycle of said oscillations and substantially no operating current during the second half of each cycle of said oscillations, and multiplier means coupled to said pulse-shaper means and operative only in response to said first and second voltage pulses coupled thereto to develop said corona voltage.

* * * * *

UNITED STATES PATENT OFFICE
CERTIFICATE OF CORRECTION

Patent No. 3,986,085          Dated    October 12, 1976

Inventor(s) Harold J. Weber

It is certified that error appears in the above-identified patent and that said Letters Patent are hereby corrected as shown below:

The drawing should appear as shown on the attached sheet.

Page 2 of 2

UNITED STATES PATENT AND TRADEMARK OFFICE
CERTIFICATE OF CORRECTION

PATENT NO. : 3,986,085
DATED : October 12, 1976
INVENTOR(S) : HAROLD J. WEBER

It is certified that error appears in the above-identified patent and that said Letters Patent are hereby corrected as shown below:

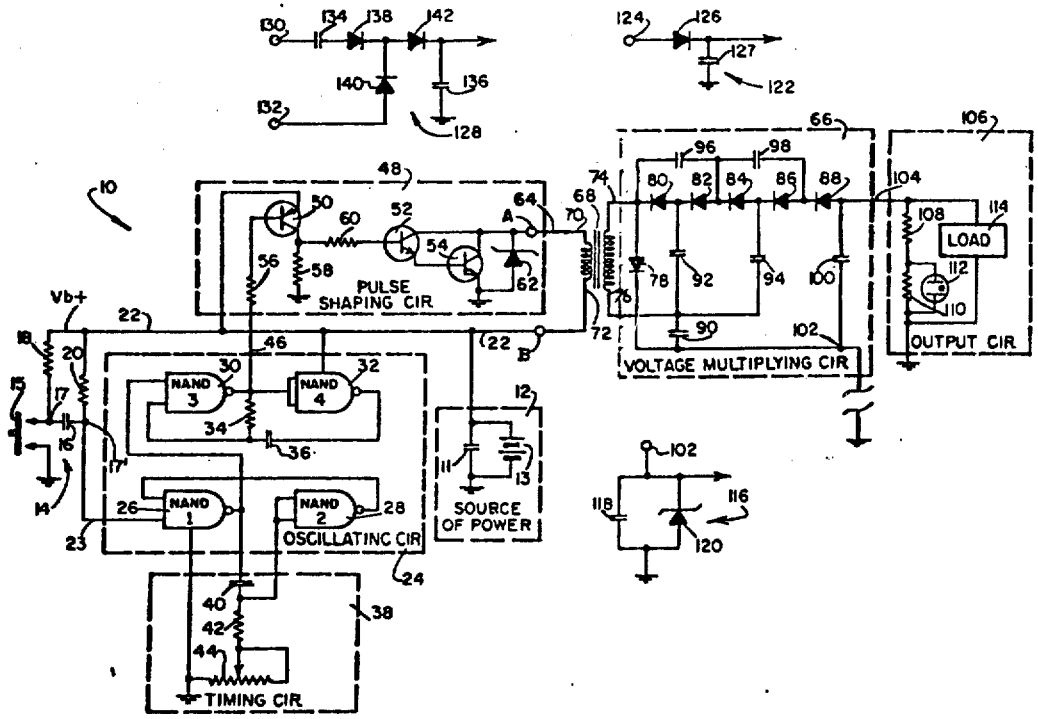

Signed and Sealed this

Thirty-first Day of May 1977

[SEAL]

Attest:

RUTH C. MASON
Attesting Officer

C. MARSHALL DANN
Commissioner of Patents and Trademarks